United States Patent
Kleinrock et al.

(10) Patent No.: US 10,803,322 B2
(45) Date of Patent: Oct. 13, 2020

(54) NETWORKS OF SENSORS COLLABORATIVELY CHRONICLING EVENTS OF INTEREST

(71) Applicant: CFKK, LLC, Beverly Hills, CA (US)

(72) Inventors: Leonard Kleinrock, Beverly Hills, CA (US); Yu Cao, Hangzhou (CN); Martin Charles Kleinrock, Mount Pleasant, SC (US)

(73) Assignee: CFKK, LLC, Beverly Hills, CA (US)

( * ) Notice: Subject to any disclaimer, the term of this patent is extended or adjusted under 35 U.S.C. 154(b) by 0 days.

(21) Appl. No.: 16/418,178

(22) Filed: May 21, 2019

(65) Prior Publication Data
US 2019/0354771 A1 Nov. 21, 2019

Related U.S. Application Data

(60) Provisional application No. 62/674,024, filed on May 21, 2018.

(51) Int. Cl.
*G06F 16/909* (2019.01)
*G06K 9/00* (2006.01)
*G06N 20/00* (2019.01)

(52) U.S. Cl.
CPC ....... *G06K 9/00771* (2013.01); *G06F 16/909* (2019.01); *G06N 20/00* (2019.01)

(58) Field of Classification Search
CPC .......... G06K 9/00771; G06K 9/00624; G06K 9/00711; G06K 9/00825; G06K 9/00664; G06K 9/00785; G06K 9/00791; H04N 21/44008; H04N 7/181; H04N 21/23418; H04N 21/2187

USPC ......................................................... 348/143
See application file for complete search history.

(56) References Cited

U.S. PATENT DOCUMENTS

| | | | |
|---|---|---|---|
| 2008/0198231 A1* | 8/2008 | Ozdemir | G08B 13/19608 348/159 |
| 2017/0221272 A1* | 8/2017 | Li | G06T 19/006 |
| 2018/0082717 A1* | 3/2018 | Bose | G11B 27/031 |
| 2018/0101970 A1* | 4/2018 | Waniguchi | G06N 7/00 |
| 2018/0130335 A1* | 5/2018 | Jedwab | G08B 25/001 |

OTHER PUBLICATIONS

Ganti, Raghu K., Fan Ye, and Hui Lei. "Mobile crowdsensing: current state and future challenges." IEEE Communications Magazine 49, No. 11 (2011) 9 pages.
Ni, Jianbing, Aiqing Zhang, Xiaodong Lin, and Xuemin Sherman Shen. "Security, Privacy, and Fairness in Fog-Based Vehicular Crowdsensing." IEEE Communications Magazine, No. 6 ( Jun. 2017): 146-152 (7 pages).
Evans, Benedict. "Ten Year Futures." Apr. 25, 2017 (7 pages).

* cited by examiner

*Primary Examiner* — Jared Walker
(74) *Attorney, Agent, or Firm* — Fish IP Law, LLP

(57) ABSTRACT

Multiple sensors are automatically recruited and coordinated to chronicle a fleeting event in a collaborative manner across time and space. An event of interest is captured and recognized by a first data capturing device. An outcome is automatically predicted, and a second data capturing device likely to have visibility of the location during occurrence of the predicted outcome is recruited to provide surveillance data of the event of interest. Surveillance data from both the first and second and subsequent data capturing devices are automatically sent to an investigation facility.

23 Claims, 11 Drawing Sheets

| Event | | | |
|---|---|---|---|
| | time | | |
| | | ephemeral | |
| | | long term | |
| | | none of the above | |
| | | | |
| | | past | |
| | | present | |
| | | future | |
| | | | |
| | space | | |
| | | moving | |
| | | stationary | |
| | | | |
| | | over a large expanse | |
| | | none of the above | |
| | | | |
| | | uncontrolled | |
| | | controlled | |
| | | | |
| | | predictable | |
| | | unpredictable | |
| | | | |
| | human-nature | | |
| | | serious importance | |
| | | casual | |
| | | bad | |
| | | good | |
| | | otherwise | |
| | | | |

Figure 5

|   |   |   |   |
|---|---|---|---|
| | | otherwise | |
| | | | |
| | "object" | | |
| | | a person's life over time | |
| | | an animal | |
| | | a plant | |
| | | an artifact such as a car | |
| | | a celestial object | |
| | | none of the above | |
| | | | |
| | societal or social | | |
| | | workplace | |
| | | | Conferences |
| | | | Meetings |
| | | | business trips |
| | | | |
| | | daily life | |
| | | | home security |
| | | | home activities |
| | | | hobbies |
| | | | care of babies |
| | | | care of the elderly |
| | | | |
| | | disasters | |
| | | | fire |
| | | | earthquake |
| | | | hurricane |
| | | | |
| | | Agriculture | |
| | | | |
| | | Construction | |
| | | | |
| | | Manufacturing | |
| | | | |

Figure 5 (Continued)

| | | Retail | |
|---|---|---|---|
| | | | |
| | | | |
| | | | |
| | | Transportation or Traffic | |
| | | | seeing a bad driver and letting other drivers know |
| | | | reporting suspected driving under the influence of drugs or alcohol |
| | | | witnessing drones in the air behaving badly |
| | | | chronicling traffic incidents |
| | | | hit and run accidents of parked or moving cars |
| | | | people exhibiting bad behavior on bicycles, electric scooters, skateboards, snowboards, skis, drones; |
| | | | |
| | | Information | remote sensing by CCTV cameras throughout a city |
| | | | |
| | | Real Estate and Rental and Leasing; | |
| | | | |
| | | Education | |
| | | | Classroom teaching |
| | | | Homework |
| | | | after school activities |
| | | | |
| | | Healthcare | |
| | | | Surgery |
| | | | hospital stay |
| | | | out-patient situation |
| | | | |
| | | Arts, Entertainment, and Recreation | |
| | | | spotting a celebrity |
| | | | a concert |
| | | | a sports event |
| | | | |
| | | Accommodation and Food Service, Hotels and restaurants | |
| | | | |
| | | | |
| | | | |

Figure 5 (Continued)

| | | | |
|---|---|---|---|
| | | Public Administration and Public Safety | |
| | | | police activities |
| | | | terrorist activities |
| | | | Theft |
| | | | Danger |
| | | | public nuisance |
| | | | |
| | | | |
| | | none of the above (reference: https://en.wikipedia.org/wiki/International_Standard_Industrial_Classification#2008_classification) | |
| | | | |
| | | Space and aviation | |
| | | military | tracking a sniper by two soldiers (snitches and sensors) |
| | | | Identifying and possibly tracking an unknown object |
| | none of the above | | |
| | | | |
| | Relationship between two events. | | |
| | | Nested relationship: An event within another event. | |
| | | Overlapping relationship: a second event is determined as of interested while a first event is being chronicled | |
| | | | |
| | Relative size of the event and an individual senor | | |
| | | An event can unfold over a time-space that is substantially larger than what an individual sensor can handle. | |
| | | | |
| | Consensus to some extent, and some connection with the blockchain - proof of work | | |

Figure 5 (Continued)

| chronicling an event | | | |
|---|---|---|---|
| input | | | |
| | | received triggering command | |
| | | | |
| output | | | |
| | data | | |
| | triggering commands | | |
| | | | |
| by whom | | | |
| | sensor | | |
| | sensors | | |
| | | | |
| | | | |
| settings | | | |
| | a network of sensors that has come to agreement | | |
| | | | |
| process | | | |
| | collaboratively chronicling | | |
| | non-collaboratively chronicling | | |
| | | | |
| | | | |
| | synchronous | | |
| | asynchronous | | |
| | | | |
| | creating data | | |
| | | capturing data | |
| | | gathering data | |
| | | | |
| | saving data | | |
| | | storing data | |

Figure 6

| | | | |
|---|---|---|---|
| | | | storing data |
| | | | buffering data |
| | | | none of the above |
| | | | |
| | | converting data | |
| | | | filtering data |
| | | | abstracting data |
| | | | summarizing data |
| | | | speech recognition, transcribing from audio, translation between languages (http://news.mit.edu/2014/algorithm-recovers-speech-from-vibrations-0804) |
| | | | |
| | | evaluating data | |
| | | | |
| | | discarding data | |
| | | | deleting data |
| | | | caching data |
| | | | |
| | | moving data | |
| | | | receiving data |
| | | | transferring data |
| | | | uploading data |
| | | distributing data | |
| | | | |
| | | rendering data | |
| | | | fusing data |
| | | | calculating the amount of "attention" received |
| | | | |
| | | being queried | |
| | | | |
| | | none of the above | |

Figure 6 (Continued)

| data | |
|---|---|
| | usage |
| | type |
| | metadata |
| | location information and time information |
| | information and knowledge |
| | anonymization |

Figure 7

| sensors | |
|---|---|
| | type. |
| | sensor capabilities. |
| | "actuators". |
| | the Internet of Things. |
| | devices where sensors reside. |
| | the environments for a sensor. |
| | the "viewsights"/"fields of view". |

Figure 8

| a network of sensors | | |
|---|---|---|
| | | |
| terminal nodes | | |
| | heterogeneous; | |
| | homogeneous | |
| | billions of nodes | |
| | | |
| non-terminal nodes | | |
| | | |
| links | | |
| | physical line | |
| | non-physical | |
| | | optical, radio, audio, chemical, magnetic. |
| | | |
| data plane | | |
| | | |
| control plane | | |
| | | |
| management plane | | |

Figure 9

NETWORKS OF SENSORS COLLABORATIVELY CHRONICLING EVENTS OF INTEREST

This application claims priority to U.S. Provisional Patent Application No. 62/674,024, filed on May 21, 2018, which is incorporated herein by reference in its entirety. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is predictively and collaboratively chronicling fleeting events.

BACKGROUND

The following description includes information that may be useful in understanding the present invention. It is not an admission that any of the information provided herein is prior art or relevant to the presently claimed invention, or that any publication specifically or implicitly referenced is prior art.

There is an ever increasing need for chronicling events by gathering data, which are crucial for collecting information to provide "situation awareness" and to issue warnings, or for after-fact investigations or identification by law enforcement or investigative agencies. With the explosion of the Internet and mobile devices, mobile crowdsensing is possible where a large group of individuals having mobile devices can sense and compute collectively to share data and extract information to measure, map, analyze, estimate, or infer a process of common interest. See "Mobile crowdsensing: current state and future challenges." Ganti, Raghu K., Fan Ye, and Hui Lei. IEEE Communications Magazine 49, no. 11 (2011 "Security, Privacy, and Fairness in Fog-Based Vehicular Crowdsensing."); Ni, Jianbing, Aiqing Zhang, Xiaodong Lin, and Xuemin Sherman Shen. IEEE Communications Magazine 55, no. 6 (2017): 146-152. The investor Benedict Evans asks that in the era of autonomous cars "how does law enforcement change when every passing car is watching everything"? [Evans, Benedict. "Ten Year Futures." 2017.]

The need to gather data, especially traffic data, can be significantly increased with self-driving vehicles. It is expected in the near future that there will be a large number of self-driving cars, self-driving trucks, mobile robots, drones, and scooters, commingling with each other and/or with human-driving vehicles on public roads and spaces. See Associated Press. (2017, May). "What's holding back self-driving cars? Human drivers". New driving behaviors will emerge, including those that pose a danger to pedestrians, human and non-human driving vehicles. With no humans present to witness the traffic accidents, it is critical that the sensors organize themselves to chronicle these events. As observed recently, "Already there have been isolated cases of human drivers pulling into the path of cars such as Teslas, knowing they will stop because they're equipped with automatic emergency braking." [Associated Press. (2017, May). "What's holding back self-driving cars? Human drivers"].

Modern use of sensors is growing exponentially in numbers, resolution, and capacity, with a large number of sensors widely dispersed in the environment. Despite the large number and sophistication of sensors, data for certain ephemeral or moving events (e.g., a fleeing car after an accident, a fire spreading in a forested residential area) are difficult to gather because the event may be mobile, often unfolding over time and space that are substantially larger than what an individual sensor can handle. Inputs from multiple sensors from multiple locations are required, but it can be difficult to determine which sensors are available, and which are willing to be recruited to provide additional data regarding an event. It can be even more difficult to coordinate multiple sensors to work together to chronicle the fleeting events.

Thus, there is still a need for systems, methods and apparatuses that are capable of organizing a network of devices and sensors in order to collaboratively chronicle events that are ephemeral, uncontrolled, unpredictable, moving, or spreading.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

The inventive subject matter provides apparatus, systems and methods in which multiple sensors are predicted, recruited, and coordinated to chronicle a fleeting event in a collaborative manner across time and space.

One aspect of the current inventive subject matter involves a method of assisting an investigation facility by capturing chronicling an event of interest. The investigation facility can be a government officer, a government office, an insurance company, a law enforcement organization, a news agency, an emergency population warning, and a public service organization, a home owners association, an emergency population warning system. etc. Preferred embodiments use a first data capturing device D1 to capture surveillance data from a region, uses electronics and software to analyze the surveillance data from D1 to (a) recognize an event of interest, (b) predict a first location of a predicted outcome, (c) identify a second data capturing device D2 that is likely to have visibility of the first location during occurrence of the predicted outcome, and (d) automatically receive surveillance data from D2 during occurrence of the predicted outcome, and automatically providing to the investigation facility at least portions of both the surveillance data from D1 and the surveillance data from D2.

An event can be recognized in any suitable manner, including by a sensor or a software computation. For example, a motion detector (coupled with a light switch) can recognize an "event" that can be described as an object that is moving in a nearby area. For another example, a computer vision system can recognize a human who is being pursued by law enforcement, and this human's appearance in a public space is recognized as an "event". If a single event could be defined by different actors, reconciling these different definitions for the same event can be fulfilled by determining the sameness of key pieces of knowledge such as the GPS locations, the time, the speed and direction when the event is moving. Once an event is defined, the definition is sent to computers and sensors to be chronicled.

As used herein, the term "automatic" means being carried by machines (e.g., computers, mobile devices, etc) without human intervention. it is contemplated that all steps (including sub-steps) in the current inventive subject matter can be performed automatically. However, it is also contemplated that human intervention (e.g., human intelligence) can be introduced to facilitate or optimize one or more steps in an automatic process.

An event of interest can be traffic related, for example, accident involving an automotive vehicle, a collision of a motor vehicle (with a human, a pet, an object, or another motor vehicle), reckless behavior of a driver of an automotive vehicle, a hazard regarding an automotive vehicle, etc. An event of interest can also be non-traffic related, for example, sighting of a celebrity, a campus shooting, a forest fire, a residential fire, a stampede of people, a river flooding into nearby regions, a bursting dam, a tornado, a stampede of cattle, a release of toxic gas, driving under the influence of drugs or alcohol; witnessing drones in the air behaving badly, hit and run accidents of parked or moving cars; police activities, terrorist activities, theft or other criminal behavior, public nuisance, a concert, a sports event, people exhibiting bad behavior or good behavior on bicycles, electric scooters, skateboards, snowboards, skis, and drones, etc.

Contemplated events of interest can be scheduled or unscheduled, anticipated or unanticipated, of serious importance or casual or otherwise, and take place across space and time. As an example, contemplated events of interest can be a "stationary accident wreck problem" that relates to an event in which a car has been hit, and has stopped at the scene of the accident. Such an event is essentially stationary in time and space. As another example, contemplated events of interest can be a "moving drunken driver problem" that relates to an event in which a car in the traffic flow has gone "rogue", and starts to exhibit unusual behavior, such as zigzagging in the traffic. In this example the event unfolds dynamically over space and time. Other examples of "moving" events include spreading fires, for example, a fire in a residential area, in a forest that contains commercial buildings, or a fire spreading in a forest without houses or commercial buildings.

Analyzing the surveillance data to recognize an event of interest and to predict a location of a predicted outcome can be performed in any suitable manner. In preferred embodiments, the step of using electronics to analyze the data (including recognizing an event) can be achieved by machine learning, e.g., training a machine learning system by submitting previously recorded event and outcome pairings to the system, and then submitting the data from D1 to the system to recognize the event of interest. D1 is a data gathering device, for example, a cell phone, a computer with a webcam, a secure camera, a traffic camera, or a dash camera (i.e., driving recorder), etc. D1 can include at least some software portion, electronic portion, or both portions of the data processing system. A server can also include at least some software portion, electronic portion, or both portions of the data processing system. D1 and D2 can be in a fixed position or mobile at a start of the event. It is contemplated that D2 can send surveillance data directly to a data processing system, or in directly (e.g., sending the surveillance data to the data processing system through D1 or a server).

Machine learning can also be used to predict a location of an outcome. Preferred embodiments use the data processing system to analyze the surveillance data from D1 to (a) predict an alternative location of an alternative outcome, (b) identify a data capturing device D3 that is likely to have visibility of the alternative location during occurrence of the alternative outcome, and (c) automatically receive surveillance data from D3 during occurrence of the alternative outcome, and (d) automatically provide to the investigation facility at least portions of the surveillance data from D3. The data processing system can be used to direct D2 and D3, individually or in combination, to start and to stop capturing surveillance data.

As used herein, the term "outcome" means a possible development of an event of interest from the moment the event of interest is defined. A predicted outcome can be predicted trajectory, a turn, a pause, an acceleration, a deceleration, etc. As used herein, the term "alternative outcome" means an outcome that is different from a predicted outcome. For example, an outcome of a traffic collision between two vehicles is that the vehicle at fault fleeing northbound, and an "alternative outcome" can be vehicle at fault fleeing westbound.

In preferred embodiments, prediction of the location of an outcome can be made by analyzing speeds and directions of at least one actor within the region during a time window of at least one minute or one second of the event, or by utilizing location and speed data from a publically accessible data store, for at least one actor within the region during a time window of at least one minute or one second of the event. As used herein, the term "actor" refers to a participant involved in or near an event of interest. Contemplated actors can be a vehicle, a person, a scooter, a bike, etc.

Identifying a second data capturing device D2 can be performed in any suitable manner. In preferred embodiments, identifying a second data capturing device D2 can be made by accessing an electronic map that includes information of streets, vehicles, and installed devices on the streets, or by broadcasting a request from D1 to unspecified recipients, including D2. In especially preferred embodiments, the speed and direction of an actor is taken into account to predict a future location of the actor, and those data capturing devices near the predicted location are identified. For example, at Time 0, a car is spotted at Location 0 by D1 and is traveling at 60 miles per hour, as determined by D1. After 10 minutes, the car is predicated to have travelled 10 miles and thus will be on a circle with a 10 mile radius from Location 0. All data capturing devices on or near the circle are identified. If the car is determined to be traveling north, only those data capturing devices on the north half of the circle are identified.

An electronic map can also be used to identify portions of a region that include a visible pavement. In some embodiments, a predicted location outcome is only on the visible pavement shown on the electronic map. Moreover, the data processing system can direct D2 to follow or stop following an actor involved in the event. D2 can also further identify a third data capturing device D3 that is likely to have visibility of the first location during occurrence of the predicted outcome. Alternatively, a system resolver can be called upon to perform the recruitment of D2 and D3. It is contemplated that the recruitment can be done in a distributed manner, a hierarchical manner, or a centralized manner. It is also contemplated that the recruitment is done in a recursive manner, in that the first sensor recruits a second sensor, and the second sensor recruits a third sensor, and so on.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 5 tabulates a preferred definition of events, events of interest, and conflicting events.

FIG. 6 tabulates a preferred definition of chronicling an event.

FIG. 7 tabulates a preferred definition of data that are chronicled by devices and sensors.

FIG. 8 tabulates a preferred definition of devices and sensors.

FIG. 9 tabulates a preferred definition of a network of devices and sensors.

DETAILED DESCRIPTION

Figure 1:
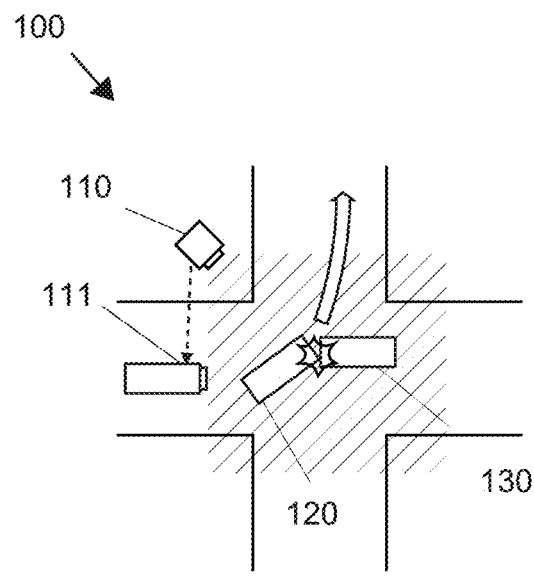
FIG. 1 depicts a schematic of a car accident event chronicled by data recording devices.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer system should be read to include any suitable combination of computing devices, including servers, interfaces, systems, databases, agents, peers, engines, controllers, storage systems, or other types of computing devices operating individually or collectively. Computer systems may have full operating systems capable of executing complex processing tasks, or may be bare bones systems whose only function is to store, receive, and transmit data to memory storage units. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on Fiber-Channel, PCIe Interface, NVMe, NVMe over Fabric, TCP, UDP, IP, HTTP, HTTPS, AES, public-private key exchanges, web service APIs, known financial transaction protocols, or other electronic information exchanging methods, including proprietary communication interfaces. Data exchanges preferably are conducted over a packet-switched network, the Internet, LAN, WAN, VPN, or other type of packet switched network. Computer software that is "programmed" with instructions is developed, compiled, and saved to a computer-readable non-transitory medium specifically to accomplish the tasks and functions set forth by the disclosure when executed by a computer processor.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

One should appreciate that the technical effects include a service, "service" as in the "traffic mapping services" offered by the Waze™ company. A contemplated embodiment is an inverse image of Uber™'s: in Uber's case, it's about looking for one car to accomplish a task; in this inventive subject matter, it is making multiple sensors collaborate for an event. A contemplated embodiment creates a service for a set of sensors, typically a large number of sensors, so that the sensors can collaborate in outputting data for events of interest. The service is carried out in the following steps. First, the sensors agree to join in an agreement to collaborate as the need arises; such joining can be accomplished by methods including, but not limited to, downloading a mobile app, going to a web site, executing a protocol. The sensors typically do not know each other in advance. At some point, a sensor notices an event of interest, the sensor starts a search for an action-related group that could already be chronicling data of the event; if such a group can be found, the sensor asks to join the group; if such a group cannot be found, the sensor starts an action-related group thus becoming the first member of this group. The sensor starts chronicling the event. At some point, a triggering command is sent by the first sensor to a second sensor, and part of the command invites the sensor to join the action-related group; the second sensor, if it accepts, becomes the second member of the action-related group and itself can enlist other sensors recursively to join the action-related group.

As used herein, the term "sensor" means a data capturing device, including its operational electronics, software and/or firmware.

One should also appreciate that the technical effects include software, including, but not limited to: (1) software that is installed at every participating sensing device, enabling the sharing of the device with other devices; (2) software for interconnectivity, for chronicling an event thus gathering data from multiple sensory systems (e.g., a person, a mobile phone, a stationary camera, camera infrastructure, cameras on different vehicles, cameras on pedestrians, cameras on drones), for the ability for a sensor (as part of a person, a mobile phone, a stationary camera) to trigger another, for a warning and reporting system that can go back in time; (3) software for managing the membership of action-related groups for the sensors, the software helping to achieve the "global/emergent/group" intelligence.

One should also appreciate that the technical effects include mobile apps, possibly for millions of users and millions of sensors and sensing devices, including, but not limited to: (1) a mobile app with which an owner of a vehicle showing evidence to the police; (2) a mobile app with which action-related groups are managed.

One should also appreciate that the technical effects include hardware, including, but not limited to: (1) a communication network connecting the sensors, (2) a wearable piece of hardware that enables a sensor to send a command to other sensors, typically a sensor that has joined the agreement; (3) a piece of hardware that works with an exterior camera mounted on a self-driving car, (4) a piece of hardware that manages the membership of the action-related groups for sensors, the hardware helping achieve the "global/emergent/group" intelligence.

One should also appreciate that the technical effects include a device that is called a "snitch". With a contemplated social policy, all vehicles, or perhaps only previously-offending vehicles (a car, a truck, a drone, a boat or other kinds of vehicles) will have agreed to have installed the "snitch" that can be activated by the police, or via some other mechanism, when necessary. Once an action occurs, such as the vehicle going rogue, then the snitch will be activated so that the vehicle's whereabouts is broadcast, preferably continually, to recipients that include, but are not limited to: a selected group of sensors, an insurance company, a person affiliated with the vehicle. The snitch can be connected to the OBD (on-board diagnostics) port of a car, or otherwise. The snitch typically is physically inside a vehicle, however, it is also contemplated that the snitch can be outside of the vehicle.

One should also appreciate that the technical effects include a device that is called a "tag". A tag is in the vicinity of a vehicle (a car, a truck, a drone, a boat or other kinds of vehicles) that is moving or stationary. A tag can be physically connected to the vehicle, using a connector such as a screw, glue, a magnet. A tag can also be non-physically connected to the vehicle, for example, hovering near the vehicle. In a contemplated embodiment, the tag broadcasts its whereabouts to recipients, similar to what the snitch does as described elsewhere in this document.

One should also appreciate that the technical effects include combining software with hardware, involving the use of middleware and/or microchips.

One should also appreciate that the technical effects include a social media site that includes a human-computer interface, where, users can view collectively sensory data (audio, video, images, etc.); data might also be from an incident from the past. Collaborative evaluation of the data, e.g. by commenting, assigning scores, voting, causing an action.

One should also appreciate that the technical effects include a marketplace in which data from chronicling events are sold and bought, or provided for free. Currency in this marketplace include usual currencies, crypto-currencies, tokens (as defined in initial token offerings), other non-currencies.

One should also appreciate that the technical effects include backend systems, which includes embedded systems, a system that connects the cameras.

FIG. 1 depicts a schematic of a car accident event chronicled by data recording devices. In FIG. 1, a first data capturing device 110 captures surveillance data from a region at an intersection. Using electronics, software or human intelligence, the surveillance data from device 110 is analyzed, and an event of interest is recognized, which is that a first vehicle 120 making a left turn at the intersection, and a second vehicle 130 approaching 120 on the passenger side of 120. Device 110 predicts an outcome that is a possible collision between 130 and 120, and device 110 predicts a first location, which is a few feet in the left-turning direction for 120, of the predicated outcome. Device 110 then accesses an electronic map, which depicts the roads of and near the intersection, and identifies a second device 111 which happens to be on a moving vehicle, that is likely to have visibility of the first location during occurrence of the predicted outcome. Device 110 recruits second device 111 (indicated by the dashed arrow) to start capturing data regarding vehicle 120. Data captured from both devices 110 and 111 are automatically provided to an investigation facility.

Figure 2:
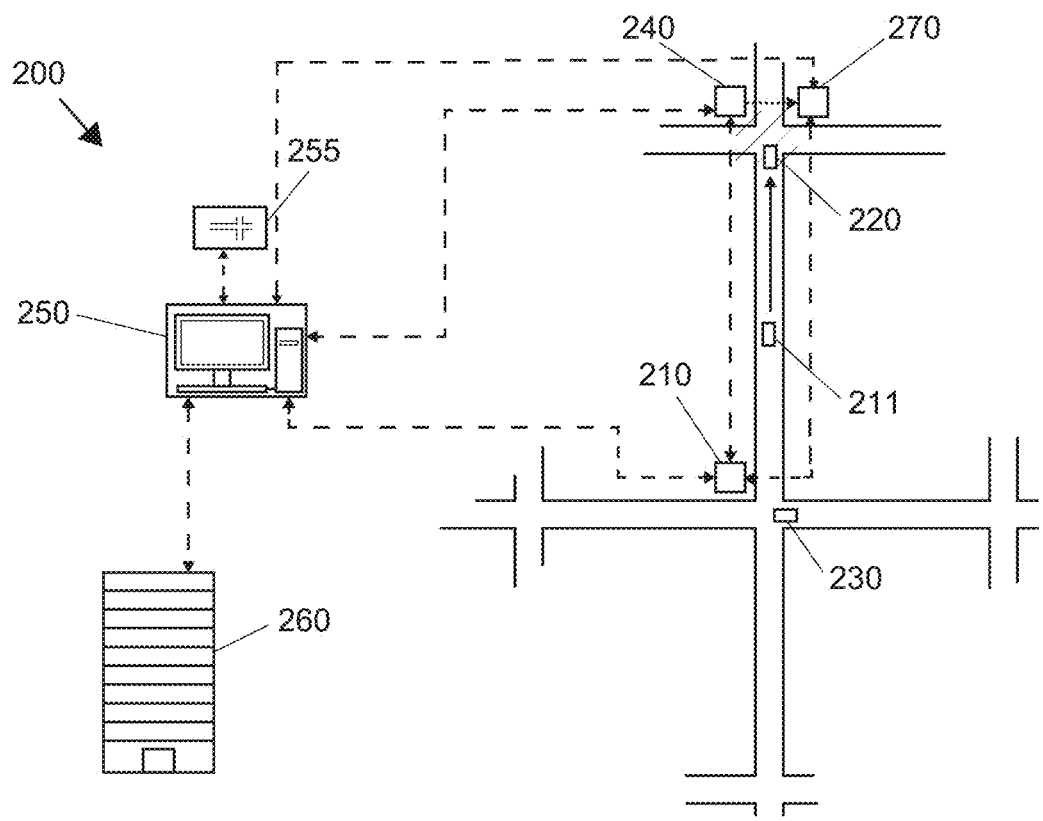
FIG. 2 depicts a schematic of the car accident event of FIG. 1, chronicled at a later time by data recording devices.

FIG. 2 depicts the continued chronicling of the event of interest in FIG. 1 at a later time by data recording devices. In FIG. 2, a first data capturing device 210 (which is device 110 in FIG. 1) captures surveillance data from a region which is the intersection in FIGS. 1. Device 210 is wirelessly or by internet cable connected to a remote server 250. The surveillance data from device 210 is analyzed by server 250 using electronics, software or human intelligence, so that an event of interest is recognized, which is the continuation of the event in FIG. 1. The event of interest includes vehicle 230 making a right turn in a first road intersection and vehicle 220 fled the scene by traveling north, approaching the next intersection. Server 250 provides an alternative predicted outcome which is that a vehicle 220 possibly running a red light, and server 250 predicts an alternative location which is the intersection neighboring the first intersection to the north. Server 250 then accesses an electronic map 255, which depicts roads that includes both intersections, and identifies device 240 to likely have visibility of the alternative location during occurrence of the predicted alternative outcome. Data from both devices 210 and 240 are automatically provided to server 250 which further provides surveillance data to an investigation facility 260. Data from device 240 can also be sent to device 210 which then sends the data to server 250. Additionally, device 240 can recruit another device 270 across the street from device 240. Device 270 begins gathering data of vehicle 220 and sends data to the server 255. Device 211 (device 111 in FIG. 1) is directed to follow vehicle 220 to provide continued data gathering.

Figure 3:
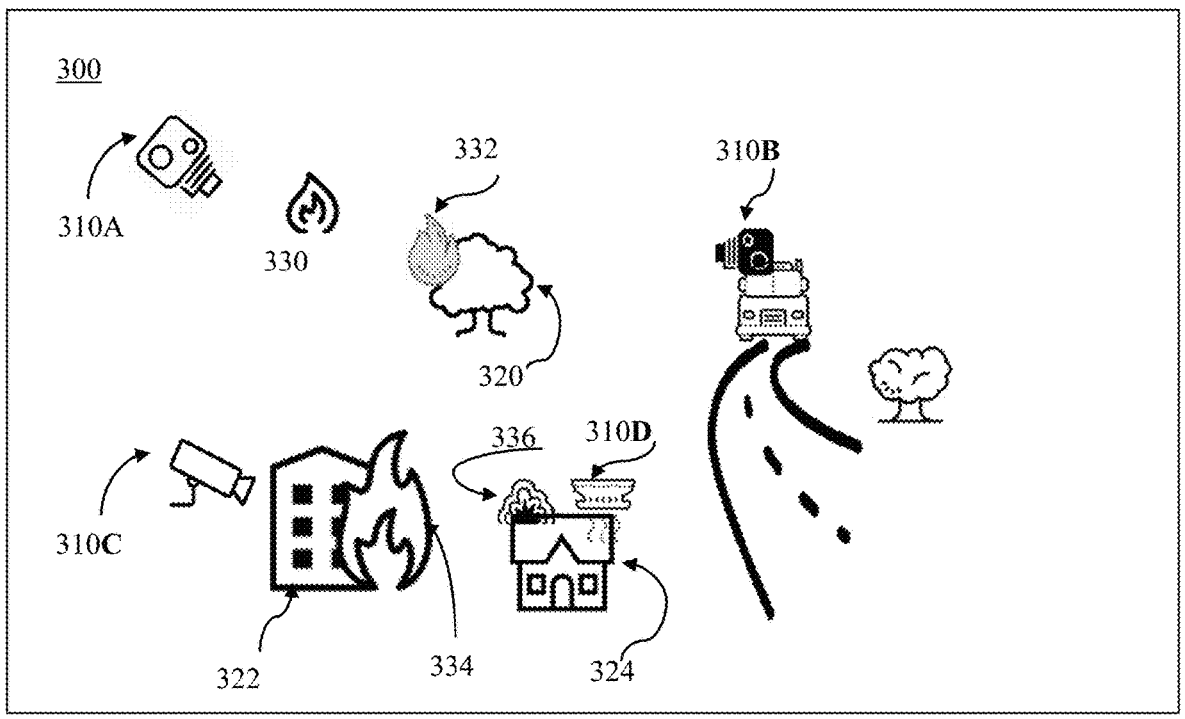
FIG. 3 depicts a schematic of various fire events chronicled by data recording devices.

FIG. 3 depicts a depicts a schematic of various fire events chronicled by data recording devices. Such an event can be a fire spreading through forest and houses within, a river flooding into an area. In 300, a first data capturing device 310A captures surveillance data from a region which happens to be a forest in which there are roads and houses. Using electronics, software or human intelligence, the surveillance data from 310A is analyzed, and an event of interest is recognized, which happens to be that there is a fire 330. Device 310A predicts an outcome that is the fire will spread to new locations; and 310A predicts a first location which is a tree 320 that might caught fire, Fire 332. Device 310A then accesses an electronic map, which depicts the forestry, the roads, the houses near the current fire, and identifies device 310B which happens to be on a moving vehicle, that is likely to have visibility of the first location during occurrence of the predicted outcome. The provision of predicted outcomes, and the prediction of locations, are in addition partially dependent on accessing a database of homes, weather conditions, and real time traffic.

Data from both 310A and 310B are automatically provided to an investigation facility. It is contemplated that the investigation facility is part of an emergency population warning system, which is tasked with provide warnings on dangers, in this particular case, a fire that spreads. During the course of the unfolding of the event, Device 310A continues capturing surveillance data from the region. Device 310A provides an alternative predicted outcome which is that the fire is spreading, and 310A predicts an alternative location which is a house, House 322, in the region. Partially based on the predicted alternative location, Device 310A identifies device 310C that is likely to have visibility of the alternative location during occurrence of the predicted alternative outcome, in this contemplated circumstance, the alternative location is the house 322 and the predicated alternative outcome is that the house 322 catches fire, Fire 334. Data from 310A, 310B and 310C are automatically provided to the investigation facility.

The event spreads, and Device 310A further provides an additional alternative predicated outcome, which is that the fire is still going on and smoke spreads, and 310A predicts an additional alternative location which is a house, House 324, in the region. Partly based on the predicted additional alternative location, Device A identifies Device 310D that is likely to have visibility of the additional alternative location during occurrence of the additional predicted alternative outcome; In this contemplated circumstance, the alternative location is the house, House 324, and the predicated alternative outcome is that House 324 has smoke, Smoke 336. Data from 310D are automatically provided to the investigation facility.

Figure 4:
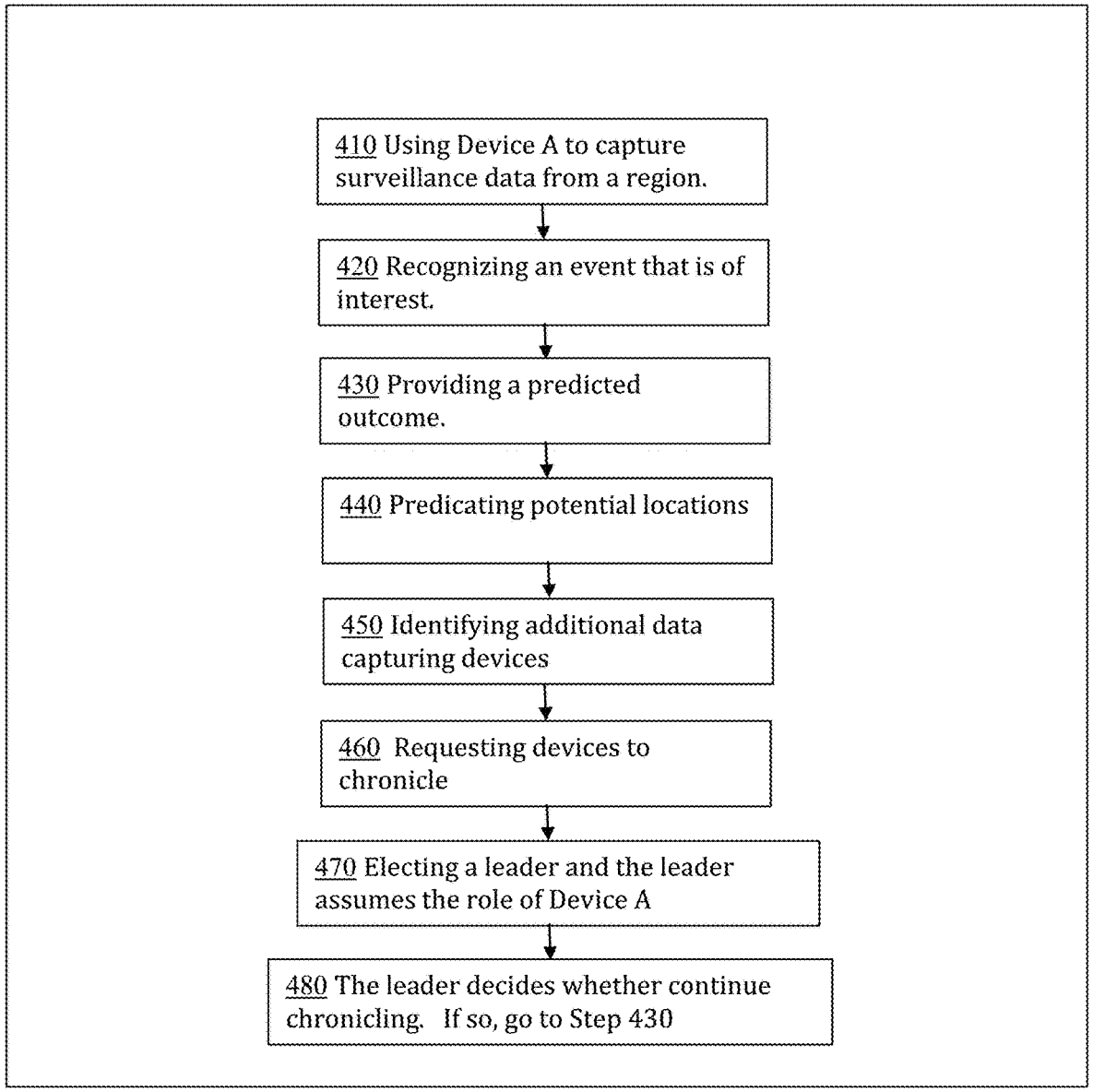
FIG. 4 is a flowchart of a preferred method for devices to collaboratively chronicle an event deemed to be of interest.

FIG. 4 is a flowchart of a preferred method for devices to collaboratively chronicle an event deemed to be of interest. A device contains at least one sensor. A major purpose of chronicling is providing data to facilities or organizations who perform in-time warnings, or after-fact investigations or identifications; such facilities and organizations include but are not limited to an insurance company, a law enforcement organization, a news agency, a home owners association, an emergency population warning system.

The method can be carried by entities including but not limited to electronics, software, humans, sensors, computers, devices. When data capturing starts with the event of interest, a device might be in a fixed position, or is mobile. A device with a fixed position can be a CCTV camera in a building or on a road; a device that's mobile can be a dash-cam on a moving vehicle, or a drone having a camera.

In a contemplated setting, a remote server is accessible by the devices and sensors. The devices, sensors, and server provide data to the facilities or organizations. These are understood as part of the "data processing system" employed by the method. In general, a device contains some electronic portion of the data processing system, the device also contains at least some software portion of the data processing system, the device further contains communications capabilities, as well as storage capabilities. Portions of data captured by the devices might be sent directly to the server, or to any software that is capable of processing, or be sent to both. Software that performs tasks such as recognition, prediction, compression, might reside entirely on the server, or might distribute on the server and multitude devices and servers.

Step 410, Using Device A to capture surveillance data from a region. The device contains at least one sensor. A definition of sensor is provided in this document. A region can be a part of a city, a part of rural area, a forest, a waterway, the sky, a building.

Step 420, Recognizing an event that is of interest. The word "recognize" here incorporates the meaning provided by Oxford English Dictionary: "Identify from knowledge of appearance or character", as well as " (of a computer or other machine) automatically identify and respond correctly to (a sound, printed character, etc.)". The word "interest" here incorporates the meaning provided by Oxford English Dictionary: "the quality of exciting curiosity or holding the attention."

The input to the recognition method additionally includes but is not limited to information from the general environment in which the network of sensors reside and to which sensors can reach. The method defines how an event can be recognized by actors such as a human, or a sensor, or a (possibly intelligent) software computation. For example, an experienced driver can readily tell that in traffic a car moving nearby exhibits unusual behavior, thus qualifying an "event" to chronicle. For another example, in the old-fashioned motion detector (coupled with a light switch) can recognize an "event" that can be described as an object that is moving in a nearby area. For still another example, a computer vision system can recognize a human who is being pursued by law enforcement, and this human's appearance in a public space is recognized as an "event". Further, the same event could be defined by different actors, therefore there is the problem of reconciling these different definitions for the same event. Such reconciliation can be fulfilled by determining the sameness of key pieces of knowledge such as the GPS locations, the time, the speed and direction if the event is moving. The output of this method includes, but is not limited to, a description of an event of interest to at least one sensor of the network of sensors.

The settings in which the entities carry out the method includes a spatial relationship between the event to be recognized as of interest. The settings also includes a time aspect of the method of recognizing. This aspect includes but is not limited to: real-time, delayed, iterative. With real-time, recognizing is carried out while the event is unfolding. With delayed, recognizing is carried out lagging behind the unfolding of the event. With iterative, recognizing is carried out more than once, a later recognizing typically uses information from an earlier recognizing. The settings also includes an interaction aspect of the method of recognizing. This aspects describes the interaction between a sensor and the event. This aspect includes but is not limited to: contact between the sensor and the event that is mechanical, electrical, or otherwise; non-contact between the sensor and the event that is optical, audio, vibration, magnetic, in-air, or otherwise.

In a contemplated embodiment, a process among the participating devices and sensors performs the task of pro-active recognizing. With this process, a participating sensor carries out the task by scanning, polling, or otherwise. Such scanning can be done continually, intermittently. Such polling can be done continually, intermittently. In another contemplated embodiment, a process among the participating sensors performs the task of passive recognizing. With this process, a participating sensor starts carrying out the task when it is interrupted, by another sensor or otherwise. In a contemplated embodiment, a process among the participating devices performs the task of recognizing using classification. With this process, a participating sensor carries out the task by matching gathered data with the description of an event. Such matching can include, but not limited to, be done algorithmically or non-algorithmically, done using image recognition, pattern recognition, deep learning, classification, text recognition, speech recognition.

Such recognition can be also done by applying Artificial Intelligence methods to gathered data about the event, such data can be photos, videos, and GPS data. The methods can employ rule-based models, or data driven models, and some such models belong to machine learning. Prior data and recognized labels are available, and such data and labels are used for training the models. After the training, the models are deployed with Device A, so that data available to Device A can be used in recognition. The method is able to find out characteristics associated with events that might be of interest. For example, some cars are of rogue driving behavior (e.g. drunken driving), others are not (a car leaving a scene of accident being unaware of having caused the accident.)

Step 430, Providing a predicted outcome.

Device A, or working with a remote server, provides a predicted outcome, which includes but is not limited to: that the event keeps unfolding, a predicated trajectory, a slowdown, a speed up, a stop, a turn, a vehicle getting off the road, a vehicle stopping, a fire spreads, a campus shooting continues, a flood dies down, a stampede grows. The predicting is partially based on history data associated similar events of interest, on the current speed and acceleration of the event, weather conditions and terrain information when the event unfolds in a natural environment.

Step 440, Predicating potential locations

Device A, or working with a remote server, calculates all potential locations of the event in the future moments, such moments can be seconds, minutes, or even hours; this step takes the input of known and historical data about the event, including the current location, the speed and the direction.

The prediction is partially dependent on the annotated directions of the possible location, the event's speed, and the amount of time into the future. The predicated paths, along with paths in the opposite direction, are assigned to the set of candidate paths.

The predication then possibly accesses an electronic map, such as the Google™ Maps or Apple™ Maps, and compares the potential location with the map, and then classifies each location as possible and impossible, a possible location in a typical case being on a pavement (which can be a road, an on-ramp, an off-ramp, an intersection, a lane that turns, or a parking space) as indicated by the map, and an impossible location possibly being not on a pavement.

Such locations might form a tree (a concept in Graph Theory). The root of the tree is the first location, and after a fork in two roads, additional possible locations are predicted on both roads; thus these predicated locations form a tree. A most likely position is chosen from the candidate locations. The choosing can be done by minimizing distance, minimizing efforts, maximizing the possibility of catching the unfolding event.

Step 450. identifying additional data capturing devices.

Device A has access to the whereabouts of devices through other electronics maps, in a manner similar to Uber™ or Waze™. The whereabouts of the devices are compared with the candidate paths, and those devices on the candidate paths are assigned to the set of collaborating devices.

Given the set of collaborating devices, and the predicated likely location, Device A further identifies a device, Device B, that is likely to have visibility of the location during occurrence of the predicted outcome.

The predication step alternatively can broadcast a request from Device A to unspecified recipients who are devices in the region. Such devices are networked with Device A through the Internet, a wireless network, a ZigBee network or any other telecommunication networks. Device B, among the devices, answers the request and indicates that it is at a certain location that has the required visibility.

Device B can choose to transmit the received request to other devices, and a receiving device can choose to transmit its received request to yet other devices; thus the requests form a cascade. Further, partially based on additional predicated outcomes, and locations associated with such outcomes, Device A identifies additional devices, each has visibility of an additional location in an additional predicated outcome.

Step 460. Device A communicating with members of the set of collaborating devices, and advising them the characteristics of the event, and requesting them to chronicle data about the event. In particular, Device B starts capturing data, and automatically provides data to Device A. In the case that a server is accessible, Device B also provides data to the server. Similarly as Device B, additional devices might also start capturing data and automatically provide data.

Step 470. Electing a leader among the members of the set of collaborating devices. The election can carry out in a number of well-known ways, including the best, the average, the random.

For the set of collaborating devices, Device A assesses for each device whether satisfaction has been met; Satisfaction is met when the event moves away thus the device has no visibility; satisfaction is also met when the event is not long of interest; satisfaction is also met when data sought has been captured. Device A asks the device to stop capturing data when satisfaction is met. The leader then takes over from Device A.

Step 480, The leader decides whether to continue chronicling.

If the leader decides the chronicling shall continue, goes back to Step 430, with the leader assuming the role of Device A.

FIG. 5 tabulates a preferred definition of events, events of interest, and conflicting events, overlapping events.

The word "event" here incorporates the meaning provided by Oxford English Dictionary: "a thing that happens or takes place, especially one of importance", and "a planned public or social occasion".

One can easily enumerate many use scenarios today where it can be valuable for an event to be chronicled. Examples include: seeing a bad driver and letting other drivers know; reporting suspected driving under the influence of drugs or alcohol; witnessing drones in the air behaving badly; traffic incidents; hit and run accidents of parked or moving cars; police activities; terrorist activities; criminal activities; theft; fire; danger; public nuisance; spotting a celebrity; a concert; a sports event; people exhibiting bad behavior or good behavior on bicycles, electric scooters, skateboards, snowboards, skis, drones; people exhibiting bad behavior or good behavior in general; as well as other events of interest. Contemplated events of interest include an accident involving an automotive vehicle, reckless behavior of a driver of an automotive vehicle, some hazard regarding an automotive vehicle, a campus shooting, a forest fire, a stampede of people, a river flooding into nearby regions, a bursting dam, a tornado, a stampede of cattle, people, a release of toxic gas.

An event typically contains an actor. An actor includes but is not limited to a vehicle, a person, a scooter, and a bike. An actor might be stationary or moving.

The inventive subject matter includes a spectrum of events that span the space-time domain. One end of the spectrum is exemplified by what is dubbed as "the stationary accident wreck problem". In the typical case of this problem, an event happens in which a car has been hit and has stopped. A key differentiator of an event at this end of the spectrum is that it is essentially stationary in time and space. Elsewhere in this spectrum we have events that are exemplified by what we dub as "the moving drunken driver problem". In the typical case of this problem, there is a car in the traffic flow that has gone "rogue" and starts to exhibit unusual behavior, such as zigzagging in the traffic. In this example we see the event unfolding dynamically over space and time. The key differentiator is that the event unfolds over a geographical area and/or over time, thus the event may be a moving one, the event may also spread over space without being a moving one such as in the case of an earthquake.

An event in terms of the length of the period over which the event unfolds, can be ephemeral, of long term, or otherwise; An event can be of past, or present, or future time. An event unfolds over time, and it might pause and continue.

An event has the characteristic of mobility which includes, but not limited to, being stationary or mobile. If mobile, an event can be "moving" at a high or low speed in relation to the mobility of the sensors.

An event has the characteristic of spatiality, which describes the geographical expanse over which an event unfolds. Such a geographical expanse can be of artifact, or not; for example, a road system, especially one with a map, is considered as having many artifacts. In contrast, a forest is considered as low in artifacts.

An event can be uncontrolled and/or unpredictable. An event can be scheduled or unscheduled. An event can be anticipated or unanticipated.

To an observer, especially a human observer, an event can be of serious importance or casual, or considered as bad behavior, or considered as good behavior, or otherwise.

An event often is about an object, including, but not limited to, a person's life over time, an animal, animals, a plant, plants, a forest, an artifact such as a car, a celestial object.

An event could contain one object, for which sensors can focus on collecting data. An event can also have multiple objects; in a further contemplated situation, these multiple objects might be related but separate, and collectively constitute an event, e.g., multiple paratroopers dropping from the sky in a war engagement, multiple cars moving along a road.

An event is often of societal value. It can take place at workplace, including, but not limited to, conferences, meetings, business trips. It can also take place in daily life, including, but not limited to, home security, home activities, hobbies, care of babies, care of the elderly. It can also be disasters, including, but not limited to, fire, earthquake, hurricane, flood, war, conflicts.

An event is often associated with economic activities or other sectors, spheres of human activities. An event can be related to agriculture, construction, manufacturing, retail. An event can be of transportation or traffic interest, including, but not limited to: seeing a bad driver and letting other drivers know, reporting suspected driving under the influence of drugs or alcohol, witnessing drones in the air behaving badly, chronicling traffic incidents, hit and run accidents of parked or moving cars, people exhibiting bad behavior on bicycles, electric scooters, skateboards, snowboards, skis, drones. Conversely, events of transportation, traffic, etc., interest may represent opportunities to chronicle positive behavior as well as negative; it can also include good behavior. It can also include conflicts be they civilian or military.

An event can be of information industry, including, but not limited to: remote sensing by CCTV cameras throughout a city. An event can be of real estate and rental and leasing. An event can be of education, including, but not limited to, classroom teaching, homework, after school activities. An event can be of healthcare, including, but not limited to: surgery, hospital stay, out-patient situation. An event can be of arts, entertainment, and recreation, including, but not limited to, spotting a celebrity, a concert, a sports event. An event can be of accommodation and food service, hotels and restaurants. An event can be of public administration and public safety, including, but not limited to: police activities, terrorist activities, theft, danger, public nuisance, military events. An event can be of otherwise members of the International Standard Industrial Classification. An event can be of space and aviation, including, but not limited to, military; an event can be tracking a sniper by one or more soldiers; an event can be tracked by snitches and tags.

Two events can have a relationship, including, but not limited to, a nested relationship in that an event is within another event; an overlapping relationship, where a second event is determined as of interest while a first event is being chronicled.

An event has a relationship with a sensor. One such relationship is the relative size of the event and the sensor, for example, an event can unfold over a time-space that is substantially larger than what an individual sensor can handle.

FIG. 6 tabulates a preferred definition of chronicling an event.

A considered purpose for chronicling an event is assisting an investigation facility. An investigating facility includes but is not limited to a government office, an insurance company, a law enforcement organization, a news agency, an emergency population warning system, and a public service organization. An emergency population warning system is a method whereby local, regional, or national authorities can contact members of the public en masse to warn them of an impending emergency. A public service organization can be an NGO (non-governmental organization), an organizer of a public festival, an organizer of a large gathering of people.

The method of chronicling of an event is performed by one or more than one sensor in the network of sensors. These sensors have come to the agreement for collaboration.

The word "chronicling" here incorporates the meaning provided by Oxford English Dictionary: "record (a related series of events) in a factual and detailed way."

The input to the method includes, but is not limited to, the triggering command received by the sensor, a description of an event and knowledge from the general environment, among others. The information contained in the trigger command is described elsewhere in this document. The output of this method includes, but is not limited to, the chronicled data which is described elsewhere in this document, and triggering commands to be sent to a sensor or sensors not yet participating in the chronicling of the event.

In a contemplated embodiment, a process among the participating sensors performs the task of collaboratively chronicling.

In another contemplated embodiment, a process among the participating sensors performs the task of non-collaboratively chronicling.

In a contemplated embodiment, a process among the participating sensors performs the task of synchronous chronicling. With this process, the participating sensors carry out their tasks all at the same time.

In another contemplated embodiment, a process among the participating sensors performs the task of asynchronous chronicling. With this process, a participating sensor starts carrying out its task at a different time from another participating sensor. Two participating sensors could overlap (both in time, space and function) in carrying out their tasks. In a preferred embodiment, at any moment, at least one participating sensor carries out its tasks. In another contemplated embodiment, during some periods of time, there may be no sensors carrying out its tasks.

In a contemplated embodiment, the chronicling ends. The end may be caused by the stop of the event, the determination of the stop can be done by a sensor, a human, a system resolver. The end may also be caused by the lack of capacity of the participating sensors in chronicling the event.

In another completed embodiment, two chronicled events are compared so that it is determined whether the two events are related; such determination may be done by comparing the objects that are contained in each event, a description of such objects can be found elsewhere in this document.

In a contemplated embodiment, a process among the participating sensors performs the task of sensing/data. In one contemplated embodiment, a sensor performs the task of capturing data. Such capturing is done by carrying out the sensory function of the sensor, or done otherwise. In another contemplated embodiment, a sensor performs the task of gathering data. Such gathering in a contemplated method is done by cloning data that exists already.

In a contemplated embodiment, a process among the participating sensors performs the task of saving data. In one contemplated embodiment, a sensor performs the task of buffering data. Such buffering typically is ephemeral in nature, in that data might be lost in a relatively short period of time. In another contemplated embodiment, a sensor performs the task of storing data. Such storing is directed at retaining past data, part of the data, data at the moment, as well as data that is buffered. Storing can be done locally, typically on the sensory device itself, or can be done non-locally, such as on a remote storage, including but not limited to cloud storage, or network-based storage. Storing can also be done by duplicating data, in order to prevent loss of data. The storage of data may utilize a blockchain.

In a contemplated embodiment, a process among the participating sensors performs the task of converting data. In one contemplated embodiment, a sensor performs the task of filtering data. Such filtering causes some data being discarded. Contemplated criteria include, but are not limited to, whether a piece of data serves the purpose of chronicling. In another contemplated embodiment, a sensor performs the task of compressing data. In another contemplated embodiment, a sensor performs the task of abstracting data. Such abstracting keeps essential parts of a body of data. In another contemplated embodiment, a sensor performs the task of summarizing data. Such summarizing includes, but not limited to, providing statistics, histograms, frequencies, summarization. In another contemplated embodiment, a sensor performs the task of speech recognition. In another contemplated embodiment, a sensor performs the task of speaker recognition. In another contemplated embodiment, a sensor performs the task of transcribing from audio, which is often referred to as speech-to-text conversion. In another contemplated embodiment, a sensor performs the task of translating from the first medium to a second medium. Such translating could be interpreting audio from visual data. [Reference: Davis, A., Rubinstein, M., Wadhwa, N., Mysore, G. J., Durand, F. and Freeman, W. T., 2014. The visual microphone: passive recovery of sound from video.].

In a contemplated embodiment, a process by a participating sensor or among the participating sensors performs the task of evaluating data. In one contemplated embodiment, a sensor performs evaluation while tracking an event. In one contemplated embodiment, a sensor performs evaluation in a shallow and quick manner. In another contemplated embodiment, a sensor performs evaluation in a deep and slow manner. In another contemplated embodiment, a sensor performs evaluation in real time. In another contemplated embodiment, a sensor performs evaluation in non real time, which is often referred to as offline.

In a contemplated embodiment, a process among the participating sensors performs the task of discarding data. In one contemplated embodiment, a sensor performs the task of deleting data. Such deleting caused data being lost permanently. In another contemplated embodiment, a sensor performs the task of caching data. With such caching, at a later point in time, data could be recovered. The caching may utilize a blockchain.

In a contemplated embodiment, a process among the participating sensors performs the task of moving data. In one contemplated embodiment, a sensor performs the task of receiving data. Such receiving can be from another sensor, or from a source that is not a sensor. In another contemplated embodiment, a sensor performs the task of transferring data. Such transferring can be over a communication network or over a short distance without going through a communication network, or otherwise. Transferring is expected to be of sufficient fidelity, or otherwise. In another contemplated embodiment, a sensor performs the task of uploading data. Such uploading typically is to a remote storage. Such uploading can involve a payment to or from the sensor.

In a contemplated embodiment, a process among the participating sensors performs the task of distributing data. Such distributing typically involves clones of data. In one contemplated embodiment, a sensor that performs distribution may charge, or be charged by, the recipient a fee for the data. In another contemplated embodiment, the distribution is to more than one recipient. In another contemplated embodiment, the distribution is to a recipient that is not part of the network of sensors. In another contemplated embodiment, the data being distributed serves the purpose of marketing and/or advertising to the recipients.

In a contemplated embodiment, a process among the participating sensors performs the task of answering queries for data. Such answering can be carried out by a sensor that has the data stored locally. The answering can also be carried out by a system resolver, who has the knowledge of where the data is. The answering can also be carried out by a central server, which substantially carries out system resolving functions. It is contemplated that methods from the field of Content Distribution Networks can be deployed.

In a contemplated embodiment, a process among the participating sensors performs the task of rendering data (e.g., as defined at Techterms.com web site under the head "rendering"). In one contemplated embodiment, rendering is directed at a party that is not part of the action-related group; in another contemplated embodiment, rendering is directed at a member of the action-related group. One contemplated situation is streaming video to a member. In another contemplated embodiment, different types of rendering are done for different kinds of recipients. In another contemplated embodiment, a sensor performs the task of fusing data. Such fusing can be done on data of the same type, or data of different types. In another contemplated embodiment, a sensor performs the task of creating statistics of data. In another contemplated embodiment, a sensor performs the task of calculating the amount of attention directed to the event. Such calculating can be done in ways that include, but are not limited to: adding up the amount of data that has been chronicled, weighted summation of data by different sensors, weighted summation of recency of data, adding up the output of summarizing.

In a contemplated embodiment, a process among the participating sensors performs the task of chronicling in ways that are not fully described by the processes above.

A number of use scenarios are considered.

The use scenarios of "capturing data of bad or good driving behavior", offers videos and other kinds of data for users to vote for worst drivers in Los Angeles of the day or voting for best FedEx drivers of the day. Similar existing applications include: Reddit™ subcategories for people "adjudicating" cases; Los Angeles's famous live car-chases on TV. Currently most driving instances are not chronicled, therefore data do not exist, or do not suffice.

The use scenario of "bumping of the parked cars". This is common in daily life, where someone bumped into your car, parked or moving, or someone keys your parked car. Chronicling is needed for such automobile incidents, for the purpose of evidence gathering, for protection against all kinds of damage.

The use scenario of "cross-medium chronicling". In a considered scenario, a car is moving on a road, and the moving car is determined as an event of interest. A first sensor chronicles video of the car, and from the video data, discerns the temperatures of the exterior of the car. A triggering command is prepared if the temperatures exceeds a threshold, and the command is sent to a second sensor.

The use scenario of "chronicling a group", such as a group of a type of animal, such as in cattle ranching or in pig farming, or a fleet of vehicles, or a school of drones. The chronicled data helps to keep the formation so that every individual is accounted for all or much of the time.

The setting is that every member is equipped with sensor, likely a video camera, that can collect video data of other individuals. In a contemplated embodiment, these sensors belong to a network of sensors that come to an agreement, and at some point an event is noticed. In a contemplated embodiment, an event happens when an individual X cannot be seen by any one of the sensors carried by all other individuals. The first sensor determines that the event is of interest, and starts to chronicle the event. The first sensor creates a triggering command, which requests a recipient, which can be a sensor carried by another individual of the group. The recipient starts chronicling. More sensors can be sent triggering commands that request chronicling. At some point, chronicled data are collected, and the trajectory of individual X can be calculated from the chronicled data.

FIG. 7 tabulates a preferred definition of data that are chronicled by devices and sensors.

The term "data" here incorporates the meaning provided by Oxford English Dictionary: "facts and statistics collected together for reference or analysis", and "the quantities, characters, or symbols on which operations are performed by a computer, which may be stored and transmitted in the form of electrical signals and recorded on magnetic, optical, or mechanical recording media." or stored in any way that may be incorporated now and/or in the future.

The term "data" includes at least the following: metadata, data content, chronicled data, captured data, submitted data, generated data, the outputs from various types of processing.

Data from chronicling an event can be used for observing and reporting to the police or insurance companies or to others. Data captured can be especially useful in fixing the problems not just through law enforcement, but also through public opinion. Further, data captured can be useful in praising, thus reinforcing, good behavior in public, for example, drivers who politely yield to other vehicles. Other government, business, consumer, educational, social and entertainment applications, either serious or casual, exist.

It has been contemplated that a catalog of chronicled data may include, but not be limited to, many types of data such as the following:

Video, audio, scanned (and recognized, tagged) images, photos.

Smell, touch, pressure, temperatures, humidity, gestures.

Measured or generated data, e.g. EKG, EEG, MRI.

Fluid flow, air flow.

Data at existing sites or owned by government agencies, other institutions, or commercial entities.

Many government agencies own a lot of data that can be made available to the public. Such agencies and the data they own may include, but are not limited to, geographic information on underground water, underground pipes (e.g., pipes beneath a city), oceanic data, weather, data captured by CCTV (closed-circuit Television) monitors, crime reports, and a vast array of epidemiological data published by national health and other research organizations.

Many sites house a lot of data generated by the public. Such sites and the data on the sites may include, but are not limited to, Yahoo, Flickr, YouTube, Instagram, Facebook, Twitter, Expedia.

Many large enterprises own a lot of data. Such enterprises and their data may include, but are not limited to, oil fields (e.g., readings of the temperatures of a rig).

"Life cycles": such as the video/picture of a tree (or a mouse) over a long period of time.

Epidemiological health data: such as aggregate heart-rate or blood pressure data, infection rates.

Longitudinal data on populations detected movement within spaces (i.e. movement of an individual or individuals) for the purposes of health and/or sleep tracking Human-generated data, including, but not limited to, chat messages (e.g., on Skype, Line, Whatsapp, Twitter, Facebook, WeChat, QQ, Weibo), web pages, novels, film, video, images, scanned photos, paintings, songs, speeches, news accounts, news reporting), all printed data.

It has been contemplated that a catalog of metadata, data content, processed data, may include but is not limited to:
Metadata and data content of a piece of data;
Metadata includes but is not limited to: the location information, the time information, types of data, information about the sensor, information about the environment of the sensor, information about the device, information about the speed of the device, information about the environments of the sensor, additional information on the history of how the data has been captured, stored, and transmitted.

The Spacetime model (a definition is available at Wikipedia) can be used in describing location information and time information. A "specific spacetime" can be a point or multiple points, a line or multiple lines, a plane or multiple planes, a region or multiple regions, or any combination or set of the above.

Information or knowledge that is injected, deduced or otherwise created include, but are not limited to, ontology, knowledge base, updates to knowledge, knowledge created after machine learning;

Inquiries are also saved and stored.

Multiple types of sensor data are stored in the cloud with extensive metadata.

Metadata such as modified exif tags that anonymize the metadata and incorporate it with user-created metadata and metadata our own algorithms create, with AI-assigned levels of trust a. e.g., video footage comes with time and date stamp, as well as technical characteristics of video (frame rate, resolution)

b. GPS data are compared to topographical maps to get accurate elevation data c. User optionally provides further information: what video is being captured, if there are people in the field of vision, flight path and estimated elevation if known (for drones); what the event is (similar to hashtagging)

The System AI also performs content analysis and compares this with user information (which is not necessary, but improves marketability of data)

The System scans for alphanumeric codes to search (license plates, signs, etc.) face density, speed of traffic, etc.

The System AI comes to a decisions about the amount of people, types of scene, weather, amount of traffic, which alphanumeric codes apply to the data, etc.

all of this is coded into metadata extensive metadata is used in making user easily searchable in new ways (detailed below in marketplace)

The data may or may not be anonymized in that the exif/metadata will be retained. In a preferred embodiment, however, the identity of the account holder will be protected; this will protect privacy and also prevent going outside of the system to arrange cheaper payments As another related feature, since we should be able to measure our vehicle speed, then the frame rate of the camera could be adjusted to slow down when our vehicle is moving slowly. For example, when we stop to park on the street or in the garage of an apartment complex, the frame rate could be dropped down to a minimum (providing garage or street protection) but not zero since it continues to act as surveillance. On the highway, it could go up to the 30 fps (remember, a vehicle moving at 60 mph goes at 88 ft/sec, so 30 fps covers motion every 3 ft or so (but that may be too high for city traffic).

FIG. 8 tabulates a preferred definition of devices and sensors.

The word "sensor", "sensing devices" are used interchangeably in this document. And the word "sensor" incorporates the definition provided by the National Research Council: 'Given the impossibility of presenting a universally accepted definition for sensors, the committee used terms and definitions that are generally accepted in the current technical literature to provide the basis for discussion in this report.1 (A complete tutorial on sensors and their transduction principles is beyond the scope of the present report.) The terms "sensor" and "transducer" have often been used as synonyms. The American National Standards Institute (ANSI) standard MC6.1 defines a transducer as "a device which provides a usable output in response to a specific measurand" (Instrument Society of America, 1975). An output is defined as an "electrical quantity," and a measurand is "a physical quantity, property, or condition which is measured." In 1975, the ANSI standard stated that "transducer" was preferred to "sensor." However, the scientific literature has not generally adopted the ANSI definitions, and thus currently "sensor" is the most commonly used term. Therefore, the term "sensor" will be used throughout this report'. [A definition is given at NAP.edu site, Chapter 4.]

In a further contemplated definition, the output from a sensor is an non-electrical quantity. In a still further contemplated definition, a measurand is a non-physical quality.

A sensor can have a type that includes but is not limited to: a person, a device, a mobile phone, a car, an auto-driving car, an accelerometer, a camera, a laser, a robot, a drone, a "dumb" device such a thermostat, any sensor in a smart phone, any sensor in a car, etc.

In a preferred scenario, there are a very large number of sensors dispersed in the environment, for example, there will be a large number of self-driving cars, self-driving trucks, mobile robots, drones, commingling with humans in public spaces; each of the cars, trucks, mobile robots, drones, humans, carries many sensors.

The computing power, sensor functions, sensor capabilities, storage, communication capabilities, mobility as in being able to move on roads, at sea, or in the air, and other capabilities available to the sensors are substantial. A sensor can do any combination of the following: creating commands, executing commands, communicating, carrying out sensor functions, recording data, storing data, managing data, moving in space, panning a camera, zooming a camera, following a moving target.

A note on the sensors: Typically a sensor has also "actuators". Consider a video camera. While its main sensor is about capturing video images, there are "actuators" that control the pan, zoom, and other "actions".

In a preferred embodiment, there's a mapping from the general environment to the ontology of the sensors. In a preferred computer software implementation, an initial set of relevant knowledge about the environment, for example, maps for roads, maps for drone routes in the air, is populated in a dataset, and such a dataset is included in a Software Development Kit (SDK) for software developers.

All sensors fall under the category of the Internet of Things including, but not limited to: "dumb" sensors, angular position sensors, sensors for position sensing, sensors for angle sensing, infrared sensors, motion sensors, gyros, accelerometers, magnetometers, Geiger counters, seismometer, the LIDAR, devices measuring heart-rate, devices measuring blood pressure, devices measuring body temperature, devices measuring temperature.

It has been contemplated a catalog of devices where sensors reside, the catalog includes but is not limited to: mobile phones, PCs, "Android PCs", tablet computers, drones, airplanes, wearable devices, video cameras such as CCTV and GoPro, Lab-on-a-Chip (LOC), dash cams, body cams.

It has been contemplated a catalog of mobility of a sensor, the catalog includes, but is not limited to: stationary, mobile.

It has been contemplated a catalog of the environments for a sensor, the catalog includes, but is not limited to: underground, on the ground, in the air, at sea, outer space, a moving person/mammal/insect/fish/car, robots, inside a biological body. (Quoting Abundance by Peter Diamandis, "humans will begin incorporating these technologies into our bodies: neuroprosthetics to augment cognition; nanobots to repair the ravages of disease; bionic hearts to stave off decrepitude.").

It has been contemplated a catalog of the "viewsights"/ "field of views", the catalog includes but is not limited to:
- a bird's eyes' view: e.g., CCTV's view, e.g. that of a factory floor, that of an intersection of roads, that of a parking lot, that of a driveway of a home, a large portion of a city, a shipping route, a patrol area.
- the view by a panorama camera.
- the view by a "ball, 360-degree" camera.
- a line in the 4 dimensional space: e.g., data captured by fitbit, which is largely the movement on the ground of a dot over time.
- the view by a nano-sensor.
- the view by a gastroscope.
- the view by GoPro mounted on someone's head.
- the view by a telescope.
- the view by geo-stationary satellites.
- the view by micro-satellites It has been contemplated the range of data types available through the system, the range includes, but is not limited to:

A sensor operates at a particular segment of the "scale of the universe". While the most prominent embodiments of this invention are concerned with scales of the human body, objects that humans handle, the cities, the atmosphere, the oceans, and the continents, it is also true that scales smaller and larger are of relevance to this invention.

In the contemplated scenario, a human can also been seen as a "sensor".

Sensors form a network of sensors through communication. Such communication can be accomplished by employing any number of the established computer networks protocols such as TCP, IP, UDP, Zigbee, NFC.

FIG. 9 tabulates a preferred hierarchical relationship among the sensors.

Two sensors can have a containment relationship, where one sensor resides entirely inside another sensor; and multiple sensors can form a hierarchy with this relationship. For example, a smart phone, which is considered as a sensor in this document, contains a camera, which is a sensor, and the camera can further contain a depth sensor.

Two sensors can form an overlapping relationship. For example, two sensors inside a smart phone can share the internal memory of the phone.

Two sensors can have a complementary relationship. For example, a CCTV camera and a motion detecting sensor are commonly combined. Further, two cameras can have different viewfields, and these viewfields are complementary in that they form a larger, continuous viewfield.

Two sensors can have no relation.

FIG. 10 tabulates a preferred definition of a network of devices and sensors.

The sensors are connected with a network, largely a telecommunication network, which includes, but is not limited to, computer network, radio network. A network contains a collection of terminal nodes, and in the preferred embodiment, a terminal node is a sensor. A sensor that is connected with a network is capable of communicating.

In a contemplated typical embodiment, the terminal nodes are heterogeneous; however, it is also contemplated that the nodes can be homogeneous.

The number of terminal nodes in a network can be as small as two, or as large as billions.

The transmission links connect the nodes together; such a link is used to pass signals between nodes. A link typically is a physical line, however, a link can also be non-physical, such as being optical, radio, audio, chemical, magnetic.

Generically, a network contains at least three planes: the data plane, the control plane, and the management plane. A general description of these planes can be found in a textbook description of a computer network, the Internet, or other data networks.

The management plane arranges the terminal nodes, and non-terminal nodes, into any of the following configurations, such as hierarchical, centralized, distributed, peer-to-peer.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of assisting an investigation facility by chronicling an event of interest, comprising:
   using a first data capturing device D1 to chronicle surveillance data from a region;
   using electronics and software to analyze the surveillance data from D1 to (a) recognize an event of interest, (b) predict a future location of a first actor at a future time, wherein the future location is outside a then-current surveillance visibility of D1, and (c) identify a second data capturing device D2 that is likely to have surveillance visibility of the first actor at the future location at the future time;

transmitting, to D2, a request for D2 to begin chronicling data of the event of interest, wherein, in response to the request, D2 begins chronicling data of the event of interest; and automatically providing to the investigation facility at least portions of both the surveillance data from D1 and the surveillance data from D2.

2. The method of assisting the investigation facility of claim 1, further comprising using the data processing system to analyze the surveillance data from D1 to (a) predict an alternative location of the first actor, (b) identify a data capturing device D3 that is likely to have surveillance visibility of the alternative location of the first actor, and (c) automatically receive surveillance data from D3 of the first actor, and (d) automatically provide to the investigation facility at least portions of the surveillance data from D3.

3. The method of assisting the investigation facility of claim 1, wherein the step of using electronics to analyze the data comprises training a machine learning system by submitting previously recorded event and outcome pairings to the system, and then submitting the data from D1 to the system to at least one of (a) recognize the event of interest, and (b) predict the location of the first actor.

4. The method of assisting the investigation facility of claim 1, wherein the step of using electronics to predict the location of the first actor comprises analyzing speeds and directions of at least one actor within the region during a time window of at least one second of the event.

5. The method of assisting the investigation facility of claim 1, wherein the step of using electronics to predict the location of the first comprises utilizing location and speed data from a publicly accessible data store, for at least one actor within the region during a time window of at least one second of the event.

6. The method of assisting the investigation facility of claim 1, wherein identifying a second data capturing device D2 comprises accessing an electronic map including information of streets and vehicles and installed devices on the streets.

7. The method of assisting the investigation facility of claim 1, wherein identifying a second data capturing device D2 comprises broadcasting a request from D1 to unspecified recipients.

8. The method of assisting the investigation facility of claim 1, further comprising using an electronic map to identify portions of the region that include a visible pavement.

9. The method of assisting the investigation facility of claim 1, further comprises D2 identifying a third data capturing device D3 that is likely to have surveillance visibility of the first actor at the future location at the future time.

10. The method of assisting the investigation facility of claim 1, further comprising using the data processing system to direct D2 to move along a street to follow an actor involved in the event.

11. The method of assisting the investigation facility of claim 1, further comprising using the data processing system to direct D2 to stop following an actor involved in the event.

12. The method of assisting the investigation facility of claim 1, wherein the event of interest comprises an accident involving an automotive vehicle.

13. The method of assisting the investigation facility of claim 1, wherein the event of interest comprises reckless behavior of a driver of an automotive vehicle.

14. The method of assisting the investigation facility of claim 1, wherein at least one of D1 and D2 is in a fixed position at a start of the event.

15. The method of assisting the investigation facility of claim 1, wherein at least one of D1 and D2 is mobile at a start of the event.

16. The method of assisting the investigation facility of claim 1, wherein the data processing system receives at least some of the surveillance data directly from D2.

17. The method of assisting the investigation facility of claim 1, wherein D2 sends the surveillance data to a server, and the data processing system receives at least some of the surveillance data from the server.

18. The method of assisting the investigation facility of claim 1, wherein the event of interest is selected from the group consisting of a forest fire, a stampede of people, a river flooding into nearby regions, a bursting dam, a tornado, a stampede of cattle, a stampede of people, a release of toxic gas, and a propagation of any valuable notification.

19. The method of assisting the investigation facility of claim 1, wherein predicting the future location of the first actor at the future time comprises analyzing motion of the first actor.

20. The method of assisting the investigation facility of claim 1, wherein predicting the future location of the first actor at the future time comprises analyzing history data associated similar events of interest.

21. The method of assisting the investigation facility of claim 1, wherein predicting the future location of the first actor at the future time comprises analyzing current speed and acceleration of the first actor.

22. The method of assisting the investigation facility of claim 1, wherein predicting the future location of the first actor at the future time comprises analyzing weather conditions and terrain information.

23. The method of assisting the investigation facility of claim 1, wherein the first actor remains stationary at the future location.

* * * * *

UNITED STATES PATENT AND TRADEMARK OFFICE
CERTIFICATE OF CORRECTION

PATENT NO. : 10,803,322 B2
APPLICATION NO. : 16/418178
DATED : October 13, 2020
INVENTOR(S) : Leonard Kleinrock, Yu Cao and Martin Charles Kleinrock It is certified that error appears in the above-identified patent and that said Letters Patent is hereby corrected as shown below:

In the Claims

At Column 23 Line 35 in Claim 5, change, "location of the first comprises utilizing location" to --location of the first actor comprises utilizing location--

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*